Feb. 8, 1949. H. J. OGORZALY ET AL 2,461,343
CONTACTING GASEOUS FLUIDS AND SOLID PARTICLES
Filed Dec. 30, 1944 2 Sheets-Sheet 1

Henry J. Ogorzaly
Alexis Voorhies Jr. Inventors

By V. L. Young Attorney

Patented Feb. 8, 1949

2,461,343

UNITED STATES PATENT OFFICE 2,461,343

CONTACTING GASEOUS FLUIDS AND SOLID PARTICLES

Henry J. Ogorzaly, Summit, N. J., and Alexis Voorhies, Jr., Baton Rouge, La., assignors to Standard Oil Development Company, a corporation of Delaware Application December 30, 1944, Serial No. 570,741

8 Claims. (Cl. 196—52)

This invention relates to contacting solid catalyst or contact particles with gaseous fluid to remove volatile material associated with the particles, and more particularly, relates to the stripping or purging of spent or contaminated catalyst or contact particles following a hydrocarbon conversion operation.

In the catalytic conversion of hydrocarbons, such as the catalytic cracking of hydrocarbons, it is known that coke or carbonaceous material is deposited on the catalyst or contact particles and these particles must then be regenerated as by burning with air or other oxygen-containing gas in a regeneration zone to remove the coke or carbonaceous material from the particles. The regenerated catalyst or contact particles are then returned to the conversion or contacting zone for reuse in another conversion operation.

Associated with the spent or contaminated contact particles withdrawn from the conversion or contacting zone and before regeneration are entrained vapors and gases. Also, some hydrocarbon vapors and gases may be adsorbed on the adsorbent catalytic or contacting material. If the hydrocarbon vapors and gases associated with the spent catalyst or contact particles are not removed before the regeneration step, they are burned in the regeneration zone during the regeneration step and there is a loss of potential hydrocarbon product and at the same time an unnecessary burden is placed on the regeneration capacity.

We have found that higher stripping efficiency is obtained by introducing the spent or contaminated catalyst or contact particles into the lower portion of a stripping or purging vessel or zone above a perforated distribution plate, and by introducing a stripping or purging gas into the bottom portion of the stripping zone or vessel below the perforated distribution plate so that the particles and stripping gas move generally upwardly in the stripping zone or vessel as a dry fluidized mixture. The mixture overflows into a withdrawal pipe or is withdrawn from the stripping zone through a withdrawal pipe extending upwardly some distance above the perforated distribution plate.

In another form of the invention the spent or contaminated catalyst or contact particles are introduced below the perforated distribution plate where they are dispersed in the stripping gas and the dispersion or suspension is passed upwardly through the perforated distribution plate into the stripping zone where a dry dense fluidized liquid-simulating mixture is obtained. The stripped or purged particles are withdrawn from an upper portion of the fluidized mixture in the stripping zone.

With our invention the catalyst or contact particles are thoroughly mixed with the stripping gas in the stripping zone and intimate contact between the catalyst or contact particles and stripping gas is obtained.

Figures 1, 2:
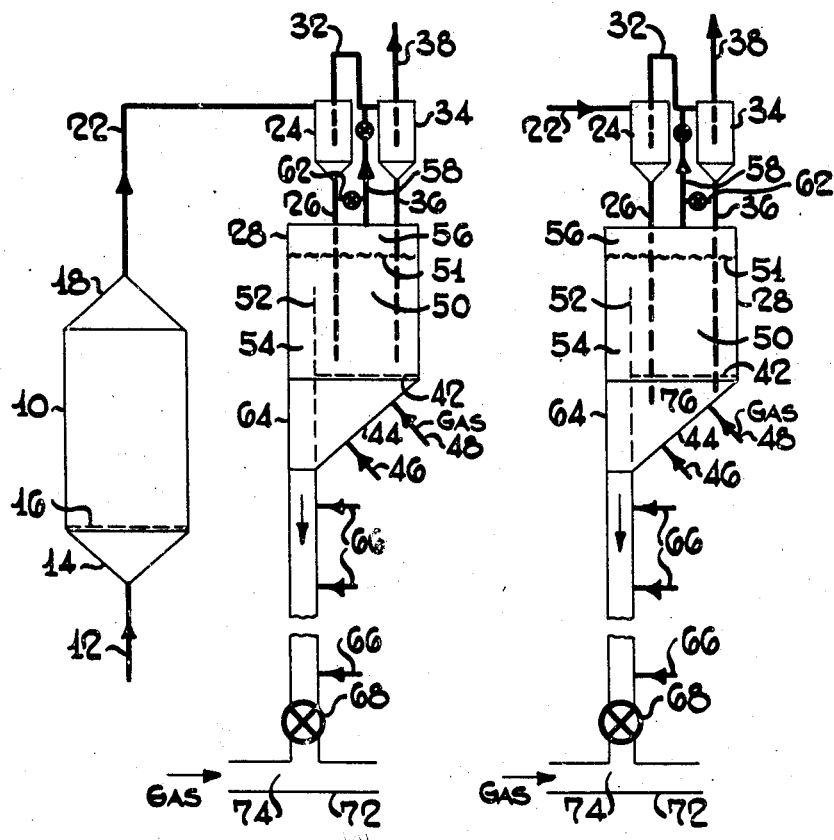
Fig. 1 represents a vertical longitudinal cross-section of one form of apparatus adapted for carrying out our invention and including an upflow reaction vessel, separating means and a stripping vessel in which the spent catalyst or contact particles are introduced into the stripping zone above the perforated distribution plate.
Fig. 2 is similar to Fig. 1 but has the reaction vessel omitted; and in this form the spent catalyst or contact particles are introduced below the perforated distribution plate where they are dispersed in the stripping gas and the resulting dispersion or suspension is passed up through the perforated distribution plate.

Referring now to Fig. 1 of the drawings, the reference character 10 designates a vertically arranged cylindrical vessel provided with a bottom inlet 12 and a conical bottom portion 14. Arranged in the bottom portion of the reaction vessel 10 is a perforated distribution plate or grid member 16 for evenly distributing the gaseous fluid and solid particles across the area of the vessel 10. In the preferred form of the invention the gaseous fluid and solid particles are introduced through line 12 into the reactor or vessel 10. However, the solid particles may be separately introduced above the distribution plate 16.

The velocity of the upflowing gaseous fluid in the reaction vessel 10 is selected to maintain the solid particles in a dry, dense, fluidized liquid-simulating mixture or bed in which the particles exhibit extreme turbulence. In the catalytic cracking of hydrocarbons, the gaseous feed may comprise any hydrocarbon oil, such as gas oil, naphtha, or other vaporizable stock. The cracking catalyst comprises any suitable cracking catalyst, such as acid-treated bentonite clays, synthetic silica alumina or synthetic silica magnesia gels, etc.

The amount of catalyst particles used in hydrocarbon conversion operation may vary between about 1.5 parts of catalyst to one of oil to 15 parts of catalyst to one of oil by weight. Preferably the catalyst particles have a size between about 100 and 400 standard mesh or finer, with about 95% passing through 100 mesh and with about 0 to 25% of 0 to 20 micron material. However, in certain cases larger particles in the broad range of 0–2000 microns may be used. The time of contact of the vapors with the catalyst particles may vary between about 3 seconds and 50 seconds. The temperature in reaction vessel 10 for hydrocarbon conversions may vary from 700° F. to 1100° F.

In the form of the apparatus shown in Fig. 1, the vaporous reaction products and the spent or contaminated catalyst particles pass overhead as a suspension from the reaction vessel 10. The reaction vessel 10 is provided with a conical top portion 18 and a top outlet line 22 which leads to a separating means 24 for separating the bulk of the catalyst particles from the vaporous reaction products in a dry separation step.

The separating means is shown in the drawing as a cyclone separator but other forms of separating means may be used. The separated solids collect in the bottom portion of the separating means 24 and are removed therefrom by means of a tube or pipe 26 which extends into a stripping vessel or zone 28 presently to be described in greater detail.

The vaporous reaction products containing some entrained catalyst particles pass overhead from the separating means 24 through line 32 to a second separating means 34 for further purification and more efficient recovery. The separated catalyst particles collect in the bottom of the separating means 34 and are withdrawn therefrom through line 36 which also extends into the stripping or purging vessel 28. The vaporous reaction products leave the second separating means 34 through line 38 and are recovered by conventional methods. When converting hydrocarbons, the vaporous reaction products from line 38 are preferably passed to a fractionating system to separate desired products from higher and lower boiling hydrocarbons.

If desired, the separating means 24 and 34 may be provided with fluidizing or aerating lines to maintain the solid particles in a fluidized condition so that they flow more rapidly downward through the pipes 26 and 36. While we have shown two separating means in series, it is to be understood that only one may be used or, if desired, more than two may be used in series to effect a better separation of solid particles from vaporous reaction products.

The stripping vessel 28 is provided with a horizontally arranged perforated distribution plate or grid member 42 in the bottom portion thereof. The stripping or purging vessel 28 is provided with a slanting bottom portion 44 through which stripping gas is introduced through lines 46 and 48 below the distribution plate 42. The spent or contaminated solid particles from the tubes 26 and 36 are introduced through the stripping vessel 28 a short distance above the distribution plate 42. The stripping gas passing upwardly through the stripping or purging vessel 28 maintains the solid particles in a dry fluidized liquid-simulating condition or mixture 50 and the stripping gas passing upwardly through the stripping or purging vessel 28 strips or purges the catalyst particles to remove hydrocarbon vapors and gases therefrom. The particles are in a turbulent condition during stripping. The temperature of the particles in the fluidized mixture 50 approximates the temperature in the reaction zone 10 and may vary between 700° F. and 1100° F. during stripping.

The stripping or purging vessel 28 is provided with a partition or wall 52 which extends upwardly from the distribution plate 42 to a short distance below the level 51 of the dense, fluidized mixture in the stripping vessel 28. The partition 52 may extend across the entire width of the stripping vessel 28 and forms a withdrawal well 54 for withdrawing stripped or purged catalyst or contact particles from the vessel 28.

As shown in the drawing, the upper portion of the partition 52 is below the level 51 of the mixture in the stripping vessel 28. However, the partition 52 may be extended so that it is at the same height as the level 51 and in this case the well 54 forms an overflow chamber into which the stripped or purged particles overflow and from which the stripped or purged catalyst particles are withdrawn in a relatively dense fluidized condition.

The stripping gas, which may be steam, flue gas, etc., is passed through lines 46 and 48 in sufficient amount to strip or purge the contact particles in the stripping vessel 28. As the particles to be stripped are introduced into the bottom portion of the dense fluidized mixture and as the outlet for the stripped particles is near the upper portion of the dense mixture, the particles during stripping are carried upwardly from above the distribution plate 42 to a level above the upper portion of the partition 52. The amount of stripping gas may vary between about 20 and 500 cubic feet at standard conditions per 1000 lbs. of catalyst passing through the stripping vessel 28.

During stripping the hydrocarbon vapors and gases associated with the spent catalyst or contact particles are displaced and move into the disperse space 56 above the level 51 of the dense mixture. The stripping gas and vaporous material stripped out of the catalyst or contact particles are withdrawn overhead from the stripping vessel 28 through line 58. The stripping gas and vapors contain some entrained catalyst or contact particles and they may be passed to line 32 for passage through the second separating means 34. Or the stripping gas and vapors may be separately withdrawn from line 58 through line 62 and the hydrocarbon vapors may be separately recovered from the stripping gas, such as steam, in an extraneous separator.

The stripped catalyst or contact particles flow downward from the well 54 into a standpipe 64 which forms a continuation of the well 54. The standpipe is preferably provided with fluidizing lines 66 to maintain the particles in a fluidized condition so that the column of fluidized particles exerts a hydrostatic pressure at the base of the standpipe. The standpipe is sufficiently high to produce a pressure sufficient to pass the stripped particles to a regeneration zone (not shown).

Preferably the standpipe 64 is provided with a valve 68 for controlling the rate of withdrawal of the purged or stripped catalyst particles from the standpipe. The particles are introduced into line 72 where they are mixed with a regenerating gas introduced through line 74 to form a less dense suspension and this suspension is passed to a regeneration zone (not shown).

Fig. 2 is similar to Fig. 1 but in this figure the reaction vessel has been omitted. The remaining parts, with the exception of the tubes 26 and 36, are the same as in Fig. 1 and corresponding parts have been numbered with the same reference characters.

In Fig. 2 the lines or tubes 26 and 36 which lead down from the separating means 24 and 34 respectively, have been extended below the distribution plate 42. In this form of the invention the solid particles from the separating means are introduced to the space 76 below the distribution plate 42 and are dispersed or suspended in the stripping gas introduced through lines 46 and 48 and this suspension or dispersion is then passed upwardly through the distribution plate 42 to form a relatively dense mixture 50 having a level indicated at 51. With this form of the invention additional stripping is effected by suspending the spent or contaminated catalyst or contact particles in the stripping gas before the solid particles are introduced into the stripping or purging vessel 28, and improved distribution of the catalyst particles being stripped results from their passage through the grid.

Figure 3:
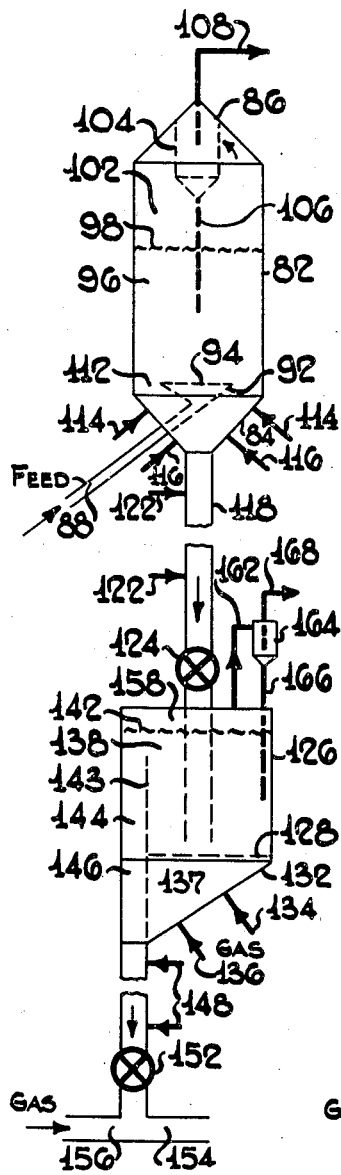
Fig. 3 represents a vertical longitudinal cross-section of another form of apparatus adapted for carrying out our invention and including a bottom draw-off reaction vessel and a separate stripping vessel into which the catalyst particles are introduced above the distribution plate therein.

Referring now to Fig. 3, the reference character 82 designates a vertically arranged cylindrical reaction vessel having a conical bottom portion 84 and a conical top portion 86. A feed line or inlet 88 is provided which terminates in an inverted conical feed member 92 in the lower portion of the vessel 82. The conical inlet 92 is provided with a distribution plate 94 arranged in a horizontal position. The feed through line 88 in a hydrocarbon conversion operation may comprise any suitable hydrocarbon oil, such as gas oil, naphtha, reduced crude, residual oils, crude oil, etc. Preferably the preheated or vaporized oil is mixed with a sufficient amount of hot regenerated catalyst particles to vaporize any unvaporized oil or to heat the vapors to reaction or conversion temperature.

A sufficient amount of catalyst is used to provide a dense bed or mixture of fluidized particles shown at 96 having a level indicated at 98. Above the dense bed or mixture is a dilute phase or suspension 102 in which the vaporous reaction products contain only a small amount of entrained catalyst particles. The ratio of catalyst to oil may vary between about 5 parts of catalyst to one of oil to 35 parts of catalyst to one of oil by weight. Preferably the catalyst particles are finely divided as described in connection with Fig. 1.

The vaporous reaction products containing entrained catalyst or contact particles are passed through separating means 104 arranged in the upper portion of the reaction vessel 82 for separating a large part of the entrained particles from the vaporous reaction products. The separated particles are withdrawn from the bottom of the separating means through line 106 and are returned to the dense bed or mixture 96 below the level 98. Vaporous reaction products pass overhead through line 108 and may be treated as desired to recover desired products.

During the cracking or conversion operation the catalyst or contact particles become coated with coke or carbonaceous material. The spent or contaminated catalyst particles are withdrawn from the bottom portion of the bed or mixture 96 through the annular withdrawal space 112 arranged around the conical inlet member 92. Preferably, stripping gas is introduced through lines 114 to effect some purging or stripping of the catalyst particles being withdrawn from the dense bed or mixture 98. The catalyst particles pass into the conical bottom portion 84 where they are maintained in a dry fluidized condition by the introduction of fluidizing or aerating gas through lines 116.

The partially stripped catalyst or contact particles flow as a dense fluidized mixture into standpipe 118 provided with fluidizing lines 122 to maintain the solid particles in a fluidized condition in the standpipe so that they exert a hydrostatic pressure at the base of the standpipe. The standpipe 118 is provided with a valve 124 for controlling the rate of withdrawal of the catalyst particles from the standpipe 118.

The spent or contaminated catalyst or contact particles are introduced by means of standpipe 118 into the lower portion of a separate stripping or purging vessel 126 which is similar to the stripping vessel shown in Fig. 1. The stripping or purging vessel 126 is provided with a horizontally arranged perforated grid member 128 in its lower portion and with a slanting bottom portion 132 provided with lines 134 and 136 for the introduction of stripping gas into space 137 below the distribution plate 128.

During stripping the solid particles are maintained in a relatively dense mixture or bed 138 having a level indicated at 142. A partition 143 similar to 52 shown in Fig. 1 is provided for the purging or stripping vessel 126 and forms withdrawal well 144.

From the well 144 the stripped particles flow into standpipe 146 provided with one or more fluidizing lines 148 to maintain the particles in fluidized condition so that they exert a hydrostatic pressure at the base of the standpipe. Standpipe 146 is provided with a valve 152 for controlling the rate of removal of the particles from the standpipe. The purged or stripped particles are introduced into line 154 where they are mixed with a regenerating gas introduced through line 156 to form a less dense suspension and this suspension is passed to a regeneration vessel (not shown).

During stripping in the stripping vessel 126, the stripping gas and vapors or gases removed from the catalyst particles accumulate in the space 158 above the level 142 of the dense mixture in the purging vessel 126. The gaseous fluid comprising stripping gas and vapors is taken overhead from the purging vessel 126 through line 162 and preferably passed through a separating means 164 for removing entrained solid particles from the gaseous fluid. The separated solid particles are withdrawn from the bottom of the separating means 164 through line 166 and returned to the dense bed or mixture 138 in the stripping or purging vessel 128.

The stripping gas and vapors are withdrawn overhead from the separating means 164 through line 168 and are preferably separately treated to recover hydrocarbons and the stripping gas.

In the form of the invention shown in Fig. 3, it will be noted that the lower portion of the standpipe 118 extends to a level slightly above the distribution plate 128 so that the spent catalyst or contact particles are introduced into the lower portion of the dense bed or mixture 138. During stripping the catalyst particles are maintained in a dry, fluidized, liquid-simulating, mobile, and turbulent condition and pass upwardly through the dense bed or mixture 138 to a level above the partition 143 before they are withdrawn from the stripping or purging vessel 126. In the form of the invention shown in Fig. 3, the partition 143 may extend upwardly to the level 142 of the dense mixture.

Figure 4:
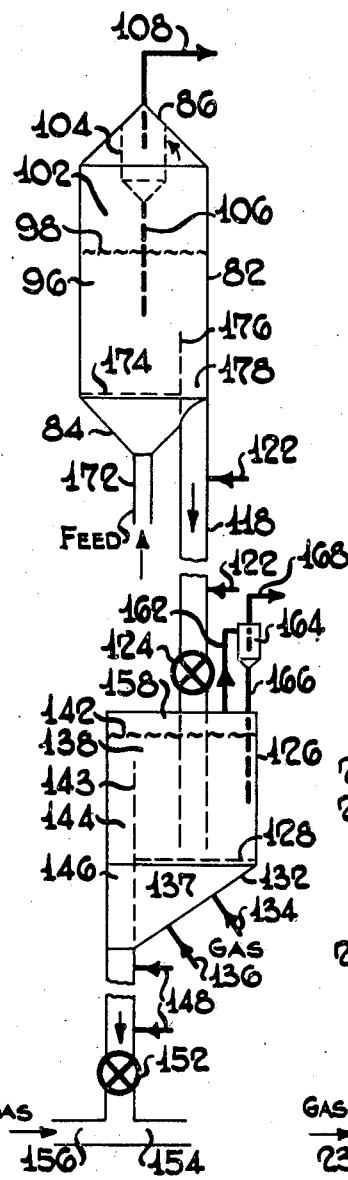
Fig. 4 is similar to Fig. 3 with a slightly different form of bottom draw-off reaction zone or vessel.

In the form of the invention shown in Fig. 4, the arrangement is generally the same and the corresponding parts have been indicated by the same reference characters. The form of the invention shown in Fig. 4 differs from that shown in Fig. 3 in that the conical inlet member 92 and the annular withdrawal and stripping zone 112 in Fig. 3 have been omitted.

In the form of the invention shown in Fig. 4, the reaction vessel 82 is provided with a bottom inlet 172 through which the reactants alone or the reactants and the catalyst or contact particles may be introduced. If the reactants only, such as hydrocarbon vapors, are introduced through line 172, separate means is provided for introducing catalyst or contact particles into the reaction vessel 82 above the distribution plate 174 arranged in the lower portion thereof.

In Fig. 4 the reaction vessel 82 is provided with a partition 176 to form a withdrawal well 178 for removing spent or contaminated particles from the dense bed or mixture 96. If desired, the partition 176 may extend upwardly to the level 98 of the dense fluidized mixture in the vessel 82. The remaining elements of Fig. 4 are the same as the elements in Fig. 3 and the same reference characters have been used to designate corresponding parts.

If desired, partial stripping may be carried on in withdrawal well 178 in a manner corresponding to that employed in withdrawal well 112 in Fig. 3. If partial stripping is not carried out at this point, it is important to keep the volume in the withdrawal well 178 and transfer standpipe 118 at a minimum in order to minimize coke deposition in these zones.

In Fig. 4 it will be noted that the discharge end of the transfer standpipe 118 extends above the distribution pltae 128 in the stripping zone or vessel 126.

Figure 5:
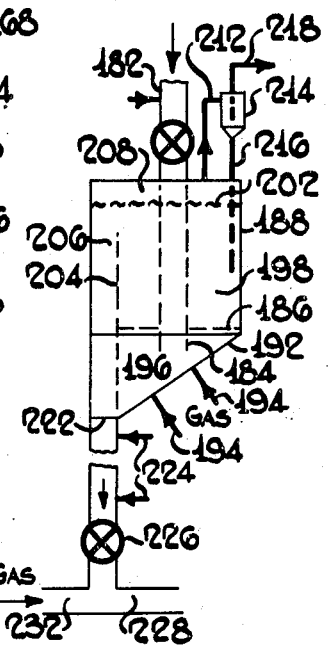
Fig. 5 represents a stripping vessel adapted for use with either reaction vessel shown in Figs. 3 and 4.

Fig. 5 shows a slightly different form of stripping vessel or zone which may be used with either of the reaction zones or vessels 82 shown in Figs. 3 and 4. In this form of the invention the standpipe 182 has its discharge end 184 below the distribution plate 186 arranged in the lower part of the stripping or purging vessel 188. The purging vessel 188 is provided with a slanting bottom portion 192 and inlet lines 194 for introducing stripping gas into the space 196 below the distribution plate 186.

The spent contact particles are mixed with the stripping gas in the space 196 to form a dilute suspension or dispersion and this suspension or dispersion is then passed upwardly through the perforated distribution plate 186 in a well distributed stream to form a dense liquid-simulating turbulent bed or mixture 198 having a level indicated at 202.

In Fig. 5 the solid particles to be stripped are moved from below the distribution plate 186 to a point above the partition 204 forming withdrawal well 206 for withdrawing stripped or purged solid particles from the stripping zone or vessel 188. The partition 204 may extend upwardly to the level 202 of the dense mixture.

The gaseous fluid accumulating in the space 208 above the dense bed or mixture 198 comprises stripping gas and hydrocarbon vapors and gases, and this gaseous fluid is withdrawn from the upper part of the stripping or purging vessel 188 through line 212 and passed to a separating means 214 to separate entrained solid particles from the gaseous fluid. The separated particles are returned to the stripping or purging vessel 188 through line 216 and the stripping gas and hydrocarbon vapors pass overhead through line 218 from which they may be passed to suitable equipment for recovering hydrocarbons from the stripping gas.

In Fig. 5 the stripped or purged particles are introduced into standpipe 222 provided with fluidizing lines 224 and a control valve 226. The purged particles are passed to line 228 where they are mixed with regenerating gas introduced through line 232 and the mixture is passed to a regeneration zone (not shown).

While our invention is especially adapted for stripping or purging catalyst particles in hydrocarbon conversion or treating operations, it is also adapted for generally removing or stripping volatile material associated with solid particles.

While we have shown several forms of apparatus adapted for use with our invention and have given particular conditions, it is to be understood that these are by way of example or illustration and various changes may be made without departing from the spirit of our invention.

We claim:

1. In a process wherein solid contact particles are maintained as a dense dry fluidized bed in a contacting zone by upward passage therethrough of gaseous fluid and the spent or fouled contact particles are withdrawn as a dense fluidized stream from the lower portion of the dense fluidized bed while a gaseous stream is withdrawn from the top of the contacting zone, the improvement of first passing the withdrawn dense fluidized particles downwardly through a first stripping zone beneath said contacting zone, passing a primary stripping gas upwardly through the first stripping zone into the contacting zone whereby the particles are partially stripped, then passing the partially stripped particles into the bottom portion of a second separate stripping zone, introducing a secondary stripping gas into the bottom portion of said second stripping zone, mixing the partially stripped particles with the secondary gas to form a dilute suspension in said bottom portion, passing the suspension upwardly as a plurality of streams into an upper portion of the second stripping zone at a gas velocity adapted to form a dense fluidized mixture having a level in the upper portion of said second stripping zone while purging them and while moving them generally upwardly in the said upper portion, removing stripped contact particles from below the level of the dense fluidized mixture in said second stripping zone and removing secondary stripping gas and stripped material from above the fluidized level of said second stripping zone.

2. A process according to claim 1 wherein the stripped contact particles overflow a partition in said second stripping zone into a withdrawal well.

3. A process according to claim 1 wherein said contacting zone comprises a conversion zone, said gaseous fluid passing to said contacting zone comprises hydrocarbons to be converted, said contact particles comprise spent conversion catalyst particles containing entrained hydrocarbon vapors and gases.

4. In a process wherein solid catalyst particles are maintained as a dense dry fluidized bed in a conversion zone by upward passage therethrough of a gas containing hydrocarbon vapors and the spent catalyst particles substantially at conversion temperature are withdrawn as a dense fluidized stream from the lower portion of the fluidized bed while a gas stream is withdrawn overhead, the improvement of first passing the withdrawn particles downwardly through an annular stripping zone directly beneath the conversion zone, simultaneously passing a primary stripping gas upwardly through the annular zone into the conversion zone whereby the particles are partly stripped, then withdrawing and passing the partly stripped particles into the bottom portion of a second stripping zone below a perforated distribution plate, simultaneously introducing a secondary stripping gas into the bottom portion, mixing the partly stripped particles with the secondary gas to form a dilute suspension in said bottom portion, passing said dilute suspension upwardly through the distribution plate into the upper portion of the second stripping zone at a gas velocity adapted to form a dense turbulent bed of particles having a level in said upper portion of the second stripping zone, thereby purging the particles and moving them generally upwardly in the said bed, removing purged particles in a fluidized condition from the bed and removing secondary stripping gas and vapors from above the bed in said second stripping zone.

5. A process for removing entrained hydrocarbon vapors and gases from solid conversion catalyst particles which comprises removing spent solid catalyst particles as a dense fluidized mixture from a contacting zone, intimately mixing the withdrawn spent catalyst particles containing entrained gaseous hydrocarbon fluid with a stripping gas in the bottom portion of a stripping zone to change the fluidized dense mixture into a dilute suspension of the solid particles in the stripping gas, maintaining said stripping zone at a temperature not higher than that of said contacting zone, passing the dilute suspension upwardly into a higher section of said stripping zone and selecting the velocity of the stripping gas therein to form a dry dense fluidized mixture of the particles having a level in the upper portion of said stripping zone, removing the stripped or purged solid particles from an upper portion of the fluidized mixture and withdrawing stripping gas and stripped hydrocarbon vapors and gas from above the fluidized mixture in said stripping zone.

6. The process for removing entrained hydrocarbon vapors and gases from solid catalyst particles which comprises introducing spent solid catalyst particles associated with volatile hydrocarbon fluid as a dense fluidized mixture into a dilute-phase stripping zone below a perforated distribution plate, introducing a stripping gas below said distribution plate, intimately mixing the catalyst particles with the gas in the dilute-phase stripping zone to form from the dense fluidized mixture a dilute suspension of the solid particles in the stripping gas, passing the suspension upwardly through said distribution plate into a stripping zone to form a dry, dense fluidized bed of particles having a level above said distribution plate, withdrawing the stripped or purged solid particles as a dense fluidized mixture from an upper portion of said bed and withdrawing stripping gas and stripped-out hydrocarbon gaseous fluid from above said bed.

7. In a process wherein solid contact particles are maintained as a dense dry fluidized bed in a contacting zone by upward passage therethrough of gaseous fluid and the spent or fouled contact particles are withdrawn as a dense fluidized mixture from the lower portion of the dense fluidized bed while a gaseous stream is withdrawn from the top of the contacting zone, the improvement which comprises first passing the withdrawn dense fluidized particles downwardly through a first stripping zone beneath said contacting zone, passing a primary stripping gas upwardly through the first stripping zone into the contacting zone whereby the particles are partially stripped, then passing the partially stripped particles into a second separate stripping zone, introducing a secondary stripping gas into the bottom portion of said second stripping zone, mixing the partially stripped particles with the secondary gas to form from the dense fluidized mixture a dilute suspension in said second stripping zone, passing the suspension upwardly as a plurality of streams into the bottom portion of a third stripping zone at a gas velocity adapted to form a dense fluidized mixture having a level in the upper portion of said third stripping zone while purging the particles and while moving them generally upwardly in the said third stripping zone, removing stripped contact particles from below the level of the dense fluidized mixture in said third stripping zone and removing stripping gas and stripped vapors from above the level of the fluidized mixture in said third stripping zone.

8. In a process wherein solid catalyst particles are maintained as a dense dry fluidized bed in a conversion zone by upward passage therethrough of a gas containing hydrocarbon vapors and the spent catalyst particles substantially at conversion temperature are withdrawn as a dense fluidized mixture from the lower portion of the fluidized bed while a gas stream containing conversion products is withdrawn overhead, the improvement which comprises first passing the withdrawn catalyst particles downwardly through a stripping zone directly beneath said conversion zone, simultaneously passing a primary stripping gas upwardly through said stripping zone into said conversion zone whereby the particles are partly stripped, then withdrawing and passing the partly stripped particles into a second stripping zone below a perforated distribution plate, simultaneously introducing a second stripping gas into said second stripping zone, mixing the partly stripped particles with the second stripping gas to form from the dense fluidized mixture a dilute suspension in said second stripping zone, passing said dilute suspension upwardly through said distribution plate into the bottom portion of a third stripping zone at a gas velocity adapted to form a dense turbulent bed of particles having a level in the upper portion of said third stripping zone thereby purging the particles and moving them generally upwardly in the said bed, removing purged particles in a fluidized condition from the bed in said third stripping zone and removing stripping gas and vapors from above the bed in said third stripping zone.

HENRY J. OGORZALY.
ALEXIS VOORHIES, Jr.

(References on following page)

REFERENCES CITED

The following references are of record in the file of this patent:

UNITED STATES PATENTS

| Number | Name | Date |
|---|---|---|
| 2,336,017 | Jewell et al. | Dec. 7, 1943 |
| 2,337,684 | Scheineman | Dec. 28, 1943 |
| 2,347,682 | Gunness | May 2, 1944 |
| 2,353,731 | Kanhofer | July 18, 1944 |
| 2,356,697 | Rial | Aug. 22, 1944 |
| 2,357,901 | Lewis et al. | Sept. 12, 1944 |
| 2,358,888 | Thomas | Sept. 26, 1944 |
| 2,360,622 | Roetheli | Oct. 17, 1944 |
| 2,367,694 | Snuggs | Jan. 23, 1945 |
| 2,380,760 | Huff | July 31, 1945 |
| 2,391,944 | Carlsmith | Jan. 1, 1946 |
| 2,407,371 | Jahnig | Sept. 10, 1946 |